United States Patent [19]

Kobayashi et al.

[11] Patent Number: 5,099,515
[45] Date of Patent: Mar. 24, 1992

[54] SECRECY DEVICE FOR WIRETAPPING PREVENTION AND DETECTION

[75] Inventors: Osamu Kobayashi, Tsurugashima; Masaki Akagawa, Hatoyama, both of Japan

[73] Assignee: Kabushiki Kaisha Nippon Conlux, Japan

[21] Appl. No.: 568,825

[22] Filed: Aug. 17, 1990

[30] Foreign Application Priority Data

Sep. 19, 1989 [JP] Japan .................................. 1-243209

[51] Int. Cl.[5] .............................................. H04M 1/68
[52] U.S. Cl. .......................................... 380/2; 380/59; 379/7
[58] Field of Search ...................... 379/7; 380/1, 2, 9, 380/23, 59

[56] References Cited

U.S. PATENT DOCUMENTS 4,760,592 7/1988 Hensley ................................. 379/7
4,823,380 4/1989 Kohen et al. ..................... 380/9 X

FOREIGN PATENT DOCUMENTS 52-83003 7/1977 Japan .
52-47641 12/1977 Japan .
53-38905 4/1978 Japan .
54-00008 3/1979 Japan .
54-40403 12/1979 Japan .
55-13669 4/1980 Japan .
55-50621 12/1980 Japan .
58-143659 8/1983 Japan .
61-54750 3/1986 Japan .
63-294048 11/1988 Japan .

Primary Examiner—Bernarr E. Gregory
Attorney, Agent, or Firm—Welsh & Katz, Ltd.

[57] ABSTRACT

A secrecy device connected between a telephone handset and a telephone body, which comprises a secrecy circuit for modulating a voice signal received from the handset on a predetermined modulation system basis to send a modulated voice signal to the telephone body and for demodulating a modulated voice signal received from the telephone body on a predetermined demodulation system basis to send a demodulated voice signal to the handset, and a detection circuit for detecting presence of a connection of a wiretapping telephone set to a line connecting two communicating party telephone sets. The detection circuit, in response to reception of a request signal generated at the secrecy device of one of the two communicating party telephone sets, generates pseudorandom data and transmits the pseudorandom data to the secrecy device of the request-signal sender telephone set, and, in response to reception of the pseudorandom data, returns as echo-back data the same data as the pseudorandom data to the secrecy device of the pseudorandom-data sender telephone set, and compares the random data generated at the secrecy device of its own telephone set with the echo-back data and when the both data do not coincide with each other, generates a detection output.

5 Claims, 4 Drawing Sheets

SECRECY DEVICE FOR WIRETAPPING PREVENTION AND DETECTION

BACKGROUND OF THE INVENTION

1. Field of the Invention

The present invention relates to secrecy devices and more particularly, to a secrecy device which has a function of detecting the presence of a connection of a wiretapping telephone set to two communicating telephone sets.

2. Description of the Related Art

Conventionally, there have been suggested various types of secrecy devices for preventing telephone wiretapping. Among these secrecy devices, the secrecy device employing a time axis companding system is most common. The secrecy device of the time axis companding system is arranged so that a voice signal is subjected to such a processing (modulation) as to expand or compress the time axis of waveform of the voice signal in accordance with a predetermined algorithm, whereby, even when a wiretapper tries to listen to the voice signal with use of a common telephone set, he cannot understand the voice signal and merely can hear it as a noise because of the modulated voice signal. There are previously prepared a plurality of sorts of algorithms for companding the time axis of the voice signal which are associated with a plurality of predetermined secret codes respectively. The communicating two parties previously select one of the secrecy codes to realize a confidential conversation based on the algorithm of the selected secrecy code.

In this case, since the telephone receiver can know, on the basis of the secrecy code, the algorithm according to which the voice signal is modulated at the side of the telephone sender, the receiver can demodulate the modulated input voice signal to the original voice signal that can be normally understood by the receiver, thus realizing the confidential conversation.

However, employment of a higher level of modulation algorithm for a secrecy device generally requires the secrecy device to become more expensive. For this reason, conventional secrecy devices employing modulation systems other than the aforementioned time-axis companding system have been practically disadvantageous from the viewpoint of manufacturing cost. Thus most conventional secrecy devices employ the time axis companding system.

The prior art secrecy device of the time axis companding system, however, has had such a problem that, since the security of the confidential conversation depends merely on the secrecy code, if a wiretapper patiently tries to know the secrecy code by some means or other, then he might be able to know it finally, in which case he can easily wiretap the conversation.

Another big problem of the prior art secrecy device is that, even when the conversation between the two parties is wiretapped, they cannot recognize the fact and even cannot locate the information leakage route.

SUMMARY OF THE INVENTION

In view of such circumstances, it is an object of the present invention to provide a secrecy device, even in the event where a secrecy code is known by a wiretapper and he tries to connect a wiretapping having the same arrangement as the present invention to the associated line for the purpose of wiretapping, which has a function of immediately detecting the presence of the wiretapping connection to prevent any wiretapping beforehand.

In accordance with an aspect of the present invention, the above object is attained by providing a secrecy device which is connected between a telephone handset and a telephone body and which comprises a secrecy circuit for modulating a voice signal received from the handset on a predetermined modulation system basis, to send a modulated voice signal to the telephone body and for demodulating a modulated voice signal received from the telephone body on a predetermined demodulation system basis to send a demodulated voice signal to the handset, and a detection circuit for detecting the presence of a connection of a wiretapping telephone set to a line connecting two communicating partly telephone sets.

In the present invention, prior to the starting of the confidential conversation or during the confidential conversation, the detection circuit can detect the presence or absence of a connection of any wiretapping telephone set. As a result, prior to the starting of an important confidential conversation, the presence of any wiretapping connection can be detected and thus any wiretapping of the important conversation can be prevented beforehand.

For example, when it is desired to start a confidential conversation, the user sets a secrecy code previously determined together with the telephone destination party and depresses a start button, whereby a start command is transmitted from the command sender to the command receiver.

The command receiver, when receiving the command, generates pseudorandom data and transmits the data to the command sender.

The command sender, when receiving the pseudorandom data, sends the same data as the received pseudorandom data to the command receiver as an echo-back data. The command receiver collates the data transmitted from its own with the echo-back data received from the command sender, and if finding a coincidence between the data, starts its secrecy device, prompts the command sender to start the secrecy device of the command sender, and establishes a confidential speech circuit.

Assume now that a wiretapping telephone set having the same function as the both telephone sets of the two communicating parties is secretly connected to the line. Then like the correct command receiver, the secrecy device of the wiretapping telephone set can also receive the start command and thus the wiretapping telephone set itself can generate the pseudorandom data.

Accordingly, the pseudorandom data receiver (command sender) receives the data from the correct command receiver and the data from the wiretapping telephone set as superimposed with each other. For this reason, the echo-back data is different from the pseudorandom data generated at the correct command receiver, whereby the command receiver can detect the presence of the connection of the wiretapping telephone set and, for example, can stop the start of the confidential conversation and also can issue an alarm to the wiretapper.

In this way, in accordance with the present invention, even when the secrecy code of the secrecy device of the present invention is unintentionally known and a wiretapping telephone set is connected thereto, the wiretapping can be detected prior to the starting of an important confidential conversation and thus any wiretapping of a confidential conversation can be beforehand prevented.

DESCRIPTION OF THE PREFERRED EMBODIMENTS

Figure 1:
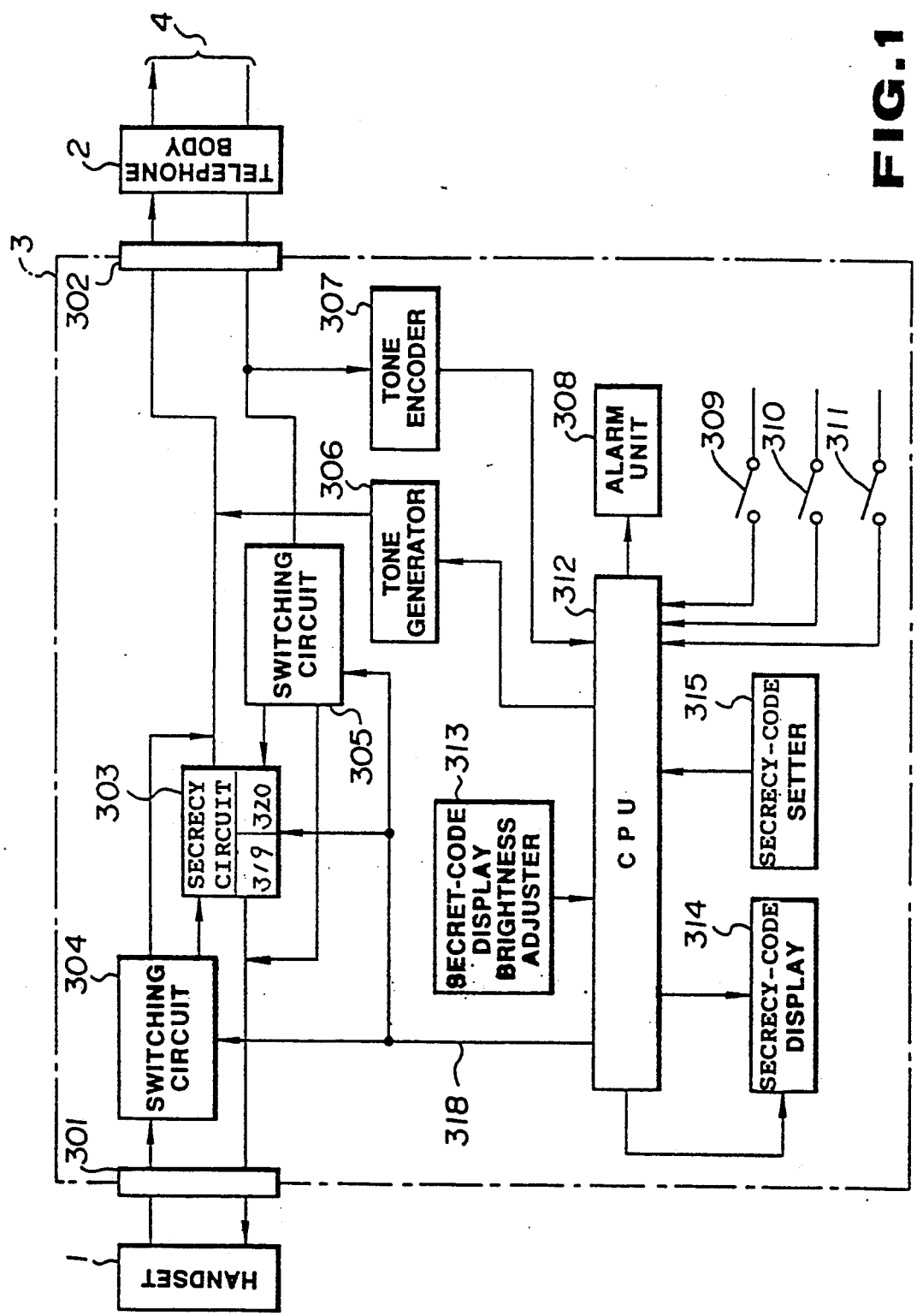
FIG. 1 is a block diagram of a secrecy device in accordance with an embodiment of the present invention.

Referring to FIG. 1, there is shown a block diagram of a secrecy device 3 in accordance with an embodiment of the present invention, wherein the secrecy device 3 is connected to a handset 1 through a handset connector 301 and also connected to a telephone body 2 through a telephone connector 302.

More specifically, the handset 1 has a telephone transmitter and a telephone receiver. A voice signal inputted to the secrecy device 3 through the telephone transmitter of the handset 1 is applied to a switching circuit 304 through the handset connector 301 so that the switching operation of the switching circuit 304 causes the voice signal to be supplied through a secrecy circuit 303, the telephone connector 302 and the telephone body 2 to lines 4 or to bypass the secrecy circuit 303 and then be supplied through the telephone connector 302 and telephone body 2 to the lines 4.

A voice signal supplied from the lines 4, on the other hand, is once received at the telephone body 2, applied to a switching circuit 305 through the telephone connector 302 so that the switching operation of the switching circuit 305 causes the voice signal to be supplied through the secrecy circuit 303 and handset connector 301 to the telephone receiver of the handset 1 or to bypass the secrecy circuit 303 and then be supplied through the handset connector 301 to the telephone receiver of the handset 1.

In the illustrated example, the secrecy circuit 303 contains contains a modulations means 319 which subjects the voice signal received from the switching circuit 304 to, for example, a predetermined modulation based on the "time axis companding system", while the demodulation means 320 contained in the circuit 303 acts to subject the voice signal received from the switching circuit 305 to a predetermined demodulation based on the time axis companding system. The secrecy circuit 303 may comprise a known circuit in the form of an integrated circuit. The sort of the modulation and demodulation at the secrecy circuit 303 is designated by a secrecy code received from a central processing unit (CPU) 312 prior to the starting of a confidential conversation. Further, the switching operation of the switching circuits 304 and 305 is controlled by a control signal received from the CPU 312. The CPU 312 includes a detection means for detecting the presence of a wiretap.

A tone generator 306 is provided to generate tone signals as commands to be used in the secrecy device 3. More in detail, the tone generator 306 generates the tone signals indicative of the respective commands with use of DTMF (dual tone multi-frequency) signals corresponding to character key switches "1" to "9", "*", "0", "#" and "A" to "D" on a keypad of the telephone set. An exemplary relationship between the commands to be used in the present embodiment and allocated characters is shown in Table below.

TABLE 1

| Character | Command | Meanings |
| --- | --- | --- |
| A | SCR | ON (Start) Request |
| A | TAP | Wiretap Check Request |
| C | CAN | Release (Cancel) Request |
| D | ACK | Acknowledge Response |
| * | STX | Start Of Text (Data) |
| # | ETX | End Of Text (Data) |

As will be clear from the above Table 1, the ON request SCR and wiretap check request TAP correspond respectively to the character "A", the release request CAN to the character "C", the acknowledge response ACK to the character "D", the data start STX to the character "*", and the data end ETX to the character "#", respectively.

The ON request SCR and the wiretap check request TAP both use the same character "A", but these two commands can be distinguished from each other by judging the operational state of the secrecy circuit at the time of receiving these commands. More concretely, if the secrecy circuit, when receiving the tone signal corresponding to the character "A", is not in its operation, then the CPU 312 judges that the command of the tone signal corresponds to the ON request; while if the secrecy circuit is in the operation, then the CPU 312 judges that the command corresponds to the wiretap check request TAP. The above commands will be detailed later.

The tone generator 306, in response to various sorts of commands received from the CPU 312, generates the DTMF signals indicative of the characters corresponding to the received commands. The DTMF signals generated at the tone generator 306 are sent through the telephone connector 302 to the telephone body 2 and further sent therefrom onto the lines 4.

A tone encoder 307 decodes a DTMF signal received at the telephone body 2 from another secrecy circuit via the lines 4 and converts it into a command corresponding to the received DTMF signal. The command decoded at the tone encoder 307 is applied to the CPU 312.

The CPU 312 receives output signals from a secrecy start switch 309 for instructing the start of a confidential conversation, a stop switch 310 for instructing the stop of the confidential conversation, a wiretap check switch 311 for instructing a wiretap check during a secret speech, a secret-code display brightness adjusting circuit 313 for adjusting the brightness of display on a secrecy code display 314 and a secrecy code setting circuit 315 for setting a secrecy code; and outputs a drive signal to a alarm unit 308 for alarming wiretapping and a drice signal to the secrecy code display 314.

Figure 2:
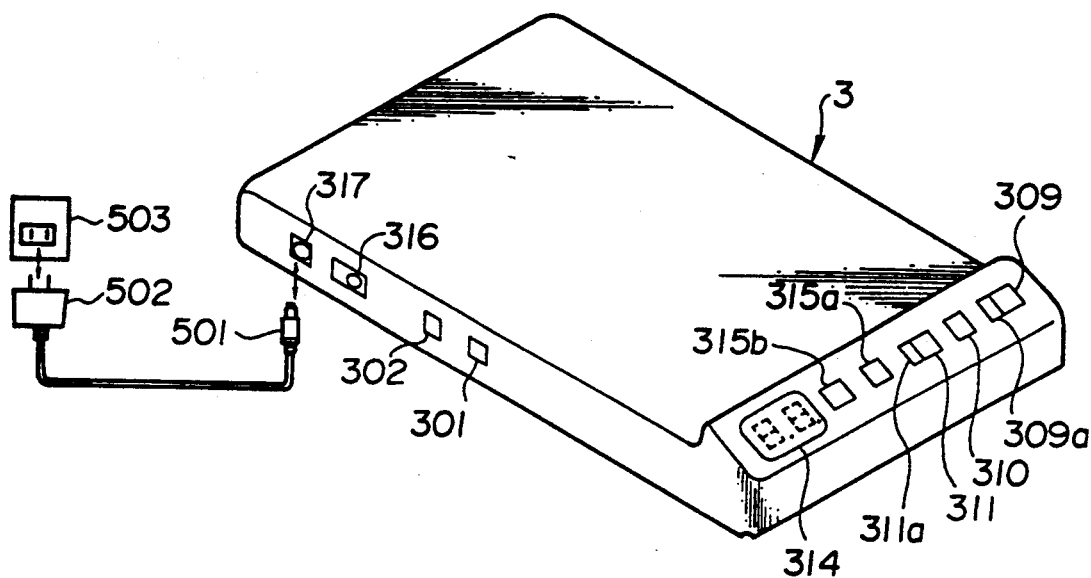
FIG. 2 is a perspective view of the secrecy device of the embodiment.

Shown in FIG. 2 is a perspective view of the secrecy device shown in FIG. 1, which has a SCR key 309, a lamp 309a for lighting up during the confidential conversation, a CAN key 310, a TAP CHECK key 311 and a lamp 311a for lighting up when a wiretapping is detected. The SCR key 309, CAN key 310 and TAP CHECK key 311 respectively correspond to the start switch 309, stop switch 310 and check switch 311 of FIG. 1. The secrecy device of FIG. 2 has also a 1 up key 315a and a 10 up key 315b which are switches for setting a secrecy code. More in detail, the 1 up key 315a is used to increment the number of ones in the secrecy code while the 10 up key 315b is to increment the number of tens in the secrecy code. The 1 up key 315a and the 10 up key 315b correspond to the secrecy code setting circuit 315 of FIG. 1. The secrecy device is also provided with a display 314 for displaying thereon the set secrecy code or the like, which corresponds to the secrecy code display 314 of FIG. 1.

The secrecy device further includes a power switch 316 and a power supply connector 317. The power supply connector 317 can be connected with a plug 501 of an AC adapter 502 which in turn connected at the other end with an AC receptacle 503.

Figure 3:
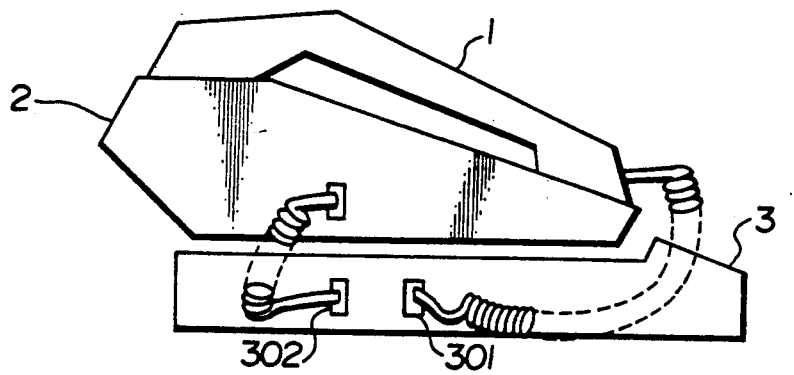
FIG. 3 shows a state in which a telephone set is mounted on the secrecy device.

FIG. 3 shows a state in which the telephone body 2 is mounted on the secrecy device 3. Input and output lines from the telephone body 2 are connected to the secrecy device 3 through the telephone connector 302 and the input and output lines from the handset connector 301 of the secret device 3 are connected to the handset 1.

The operation of the secrecy device according to the present embodiment will next be explained. First, explanation will be made as to the usual speech operation not requiring the secret speech operation.

In this case, the switching circuits 304 and 305 are switched to their positions under control of the control signal from the CPU 312 to cause a voice signal to bypass the secret circuit 303. Accordingly, a voice signal inputted from the telephone transmitter of the handset 1 to the secrecy device 3 bypasses the secrecy circuit 303 and reaches the telephone body 2; whereas a voice signal received at the secrecy device 3 from the telephone body 2 bypasses the secrecy circuit 303 and reaches the telephone receiver of the handset 1. As a result, the voice signals are not subjected at the secrecy circuit 303 to any modulating and demodulating operations. Thus, the telephone set comprising the handset 1, telephone body 2 and secrecy device 3 is operated not as a confidential telephone set but as a usual telephone set.

When it is desired for an operator to conduct confidential conversation through the telephone, the operator sets the secrecy code which the operator and the second party to the conversation have decided in advance and then turns on the ON switch 309. This causes the CPU 312 to generate the command SCR indicative of a ON request. This command is applied from the CPU 312 to the tone generator 306 to be converted therein into the DTMF signal corresponding to the character "A". The DTMF signal is then sent to the second party's telephone set (not shown) through the telephone connector 302, telephone body 2 and lines 4.

Meanwhile, even in the second party's telephone set, the secrecy device 3 is similarly connected between the handset 1 and telephone body 2 as shown in FIG. 1. For convenience of explanation, the operation of the second party's telephone set will be explained also by referring to FIG. 1.

The second party's telephone set, when receiving the DTMF signal of the character "A" from the lines 4, applies the received DTMF signal to the tone encoder 307 via the telephone body 2 and telephone connector 302 to decode therein it into the command SCR indicative of the ON request, and sends the command SCR from the tone encoder 307 to the CPU 312.

When the command received from the tone encoder 307 is indicative of the ON request the detection means of, the CPU 312 begins the process to detect the presence of a wiretap by generating predetermined pseudorandom tone data in accordance with an internal pseudorandom number generation program and sends the tone data to the tone generator 306 where the tone data is converted into the corresponding DTMF signal. The DTMF signal is sent from the tone generator 306 through the telephone connector 302, telephone body 2 and lines 4 to the telephone set which issued the ON request command SCR (which telephone set will be referred to merely as the command sender telephone set, hereinafter).

On the side of the command sender telephone set, the DTMF signal indicative of the pseudorandom data is supplied through the telephone body 2 and telephone connector 302 to the tone encoder 307 to be decoded therein into the original random data. The decoded random data is applied from the tone encoder 307 to the CPU 312.

The detection means of the CPU 312, when receiving the pseudorandom data from the tone encoder 307, applies the same data as the received pseudorandom data to the tone generator 306 as echo-back data. The tone generator 306 in turn converts the echo-back data into a DTMF signal, and sends the DTMF signal to the second party's telephone set via the telephone connector 302, telephone body 2 and lines 4.

The second party's telephone set, when receiving the DTMF signal indicative of the echo-back data, supplies the DTMF signal to the tone encoder 307 where the DTMF signal is decoded into the original echo-back signal and then is applied to the detection means of the CPU 312.

The detection means of the CPU 312 of the second party's telephone set compares the pseudorandom data generated from its own with the received echo-back data in accordance with an internal comparison program. If the detection means of the CPU 312 finds a data coincidence therebetween, then the CPU 312 generates a secrecy circuit start signal and applies it to the secrecy circuit 303 via the line 318, whereby the operation of the secrecy circuit 303 is started. The CPU 312 also applies the secrecy circuit start signal to the switching circuits 304 and 305 to cause the voice signal to pass through the secrecy circuit 303. As a result, a confidential conversation circuit is established.

Further, simultaneously with the generation of the secrecy circuit start signal, the CPU 312 transmits a signal indicative of the establishment of the confidential conversation circuit to the command sender telephone set. More concretely, the transmission of the secrecy circuit establishment signal is carried out via the tone generator in the form of a DTMF signal.

The command sender telephone set, when receiving the secrecy circuit establishment signal, generates a secrecy circuit start signal at the CPU 312 to start the operation of the secrecy circuit 303 and also switches the switching circuits 304 and 305 to cause the voice signal to pass through the secrecy circuit 303, thus establishing a confidential conversation circuit, in the same manner as in the second party's telephone set.

As a result, a confidential conversation can be realized between the command sender and second party's telephone sets.

Nex, explanation will be made in connection with the case where the same device (which will be referred to as the wiretapping telephone set, hereinafter) as shown in FIG. 1 is connected to the lines 4 for the purpose of wiretapping. In this case, when the command sender telephone set generates the DTMF signal of the character "A" indicative of the ON request SCR for the purpose of starting a confidential conversation, the wiretapping telephone set itself generates the DTMF signal indicative of the pseudorandom data in the same manner as in the second party's telephone set. However, the pseudorandom number generation programs of the wiretapping and second party's telephone sets are operated independently of each other, so that the pseudorandom data generated from the detection means of the CPU 312 of the wiretapping telephone set is different from that generated from the CPU 312 of the second party's telephone set. As a result, since the command sender telephone set cannot correctly receive the pseudorandom data from the second party's telephone set due to the pseudorandom data generated from the wiretapping telephone set, whereby the command sender telephone set cannot return the correct echo-back data to the party telephone set. In this way, the detection means of the second party's telephone set, by comparing the random data generated from its own CPU 312 with the received echo-back data at the CPU 312, can detect a noncoincidence therebetween.

The detection means of the CPU 312, when detecting a noncoincidence between the pseudorandom data generated from its own and the received echo-back data, inhibits the generation of the aforementioned secrecy circuit start signal and generates a wiretap detection signal in place of the secrecy circuit start signal so as to cause the wiretap detection signal to activate the alarm unit 308 and to issue an alarm therefrom. Simultaneously, the party telephone set transmits a signal indicative of the detection of wiretapping via the tone generator 306 to the command sender telephone set.

The CPU 312 of the command sender telephone set, when receiving the wiretap detection signal, generates a wiretap detection signal, activates the alarm unit 308 and inhibits the generation of the secrecy circuit start signal, as in the CPU 312 of the party telephone set.

When it is desired to terminate the above confidential conversation started by the turning-on of the ON switched 309 and to return the command sender telephone set to the usual speech mode, the operator turns on the secrecy stop switch 310. This results in that the CPU 312 extinguishes the secrecy circuit start signal, the switching circuits 304 and 305 return to their usual state in which the secret circuit is bypassed, the operation of the secrecy circuit is turned off, completing the confidential conversation mode.

When it is desired to check whether or not a wiretapping telephone set is connected to the line during a confidential conversation, the operator turns on the wiretap check switch 311. The turning on of switch 311 causes the CPU 312 to generate a wiretap check request TAP, whereby the telephone set transmits to the party telephone set a DTMF signal indicative of the character corresponding to the wiretap check request TAP. The second party telephone set, when receiving the wiretap check request TAP, transmits the pseudorandom data, receives the echo-back data, compares the transmitted pseudorandom data with the echo-back data, and detects the presence or absence of the connection of the wiretapping telephone set, in the same manner as when receiving the ON request SCR.

The secrecy code set prior to the starting of the confidential conversation is displayed on the secrecy code display 314. The setting of the secrecy code is carried out by means of the secrecy code setting circuit 315.

In the illustrated embodiment, for the purpose of preventing the secrecy code displayed on the secrecy code display 314 from being seen and known by others, the brightness of the secrecy code display 314 is designed to be adjusted. The control of the display brightness is effected by use of the secrecy-code display brightness adjusting circuit 313. The secrecy-code display brightness adjusting circuit 313 in FIG. 1 corresponds, for example, to the 1 up key 315a and 10 up key 315b in the arrangement of FIG. 1. More specifically, the display brightness of the secrecy code display 314 is controlled by depressing the suitable switch to put the telephone set in its secrecy-code display brightness adjustment mode and then by depressing the 1 up key 315a to brighten the display brightness by every one step or depressing the 10 up key 315b to darken the display brightness by every one step. In the secrecy-code display brightness adjustment mode, the control step of the brightness may be arranged to be displayed on the display 314.

Explanation will next be made as to the detailed operation of a communication protocol used in the present embodiment with reference to a sequence chart. The secrecy control operation of the present embodiment is roughly divided, as mentioned earlier, into three parts (a), (b) and (c) which follow.

Figure 4:
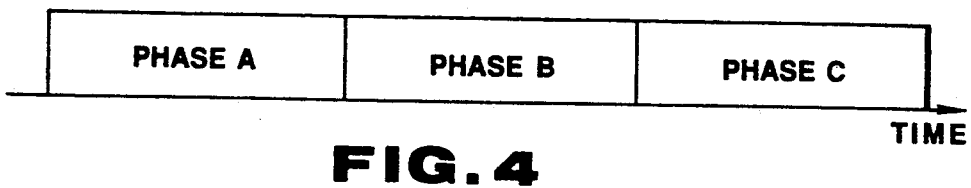
FIG. 4 shows a communication protocol used in the present invention.

(a) starting operation . . . Operation for starting a secret speech (b) Wiretap detecting operation . . . Operation for detecting a wiretapping during the confidential conversation (c) ending operation . . . Operation for . . . terminating the confidential conversation The respective operations are carried out in accordance with such three time series of phases A, B and C as shown in FIG. 4. That is, in the phase A, a transaction on whether to start such operation as secrecy control is carried out; in the phase B, a data transaction mainly for detecting a wiretap is carried out; and in the phase C, the termination of the secrecy controlling operation is informed to the party.

Figure 5:
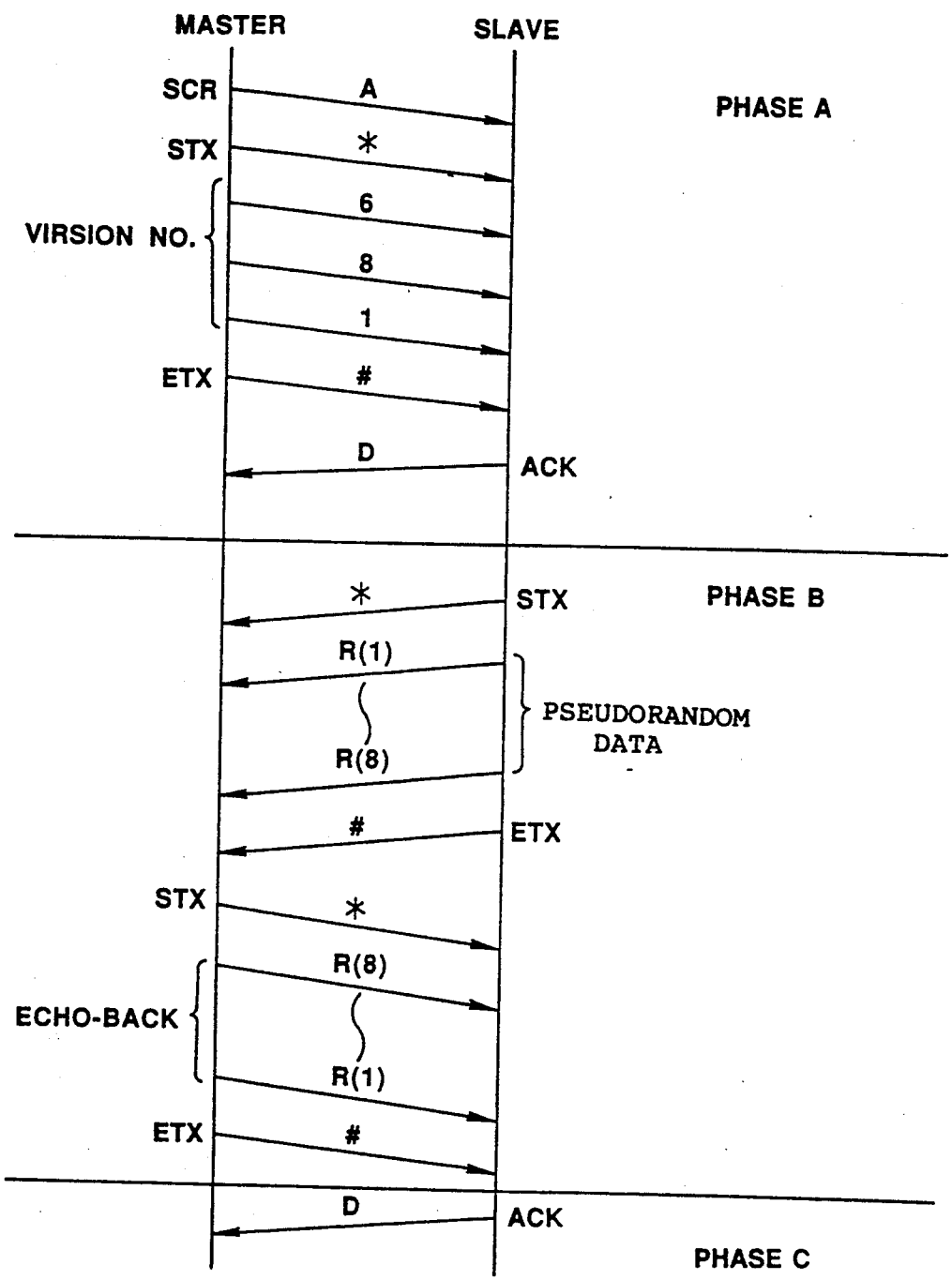
FIG. 5 is a sequence chart for explaining the secrecy starting operation of the secret device.

An exemplary secrecy starting operation is shown in FIG. 5 in which explanation will be made on the assumption that the command sender telephone set for generating the ON request SCR is a master device while the second party's telephone set is a slave device.

First, in the phase A, the master device transmits the ON request SCR followed by the text start STX, a version number from upper digits to lower ones and the text end EXT, which correspond to the characters "A" "*" "6" "8" "1" "#", respectively. The four characters first transmitted include all the frequencies of 8 sorts of DTMF signals and thus the line quality can be confirmed.

When the slave device can be operated with the received version number, the slave device immediately transmits the acknowledge response ACK.

In the phase B, the slave device transmits, for example, 8-digit pseudorandom data with the data start commnad STX attached to the head thereof and the data end command ETX attached to the tail thereof sequentially from its lower digit side. In response to this, the master device transmits an 8-digit echo-back data with the data start command STX attached to the head thereof and the data end command ETX attached to the tail thereof sequentially from its upper digit side.

In the phase C, when the data (echo-back data) received at the slave device is the same as the data (pseudorandom data) transmitted from its own, the slave device transmits an acknowledge response ACK and thereafter turns on the secret circuit.

The master device, when receiving the acknowledge response ACK, turns on the secrecy circuit at the moment when the received acknowledge response ACK disappears.

Figure 6:
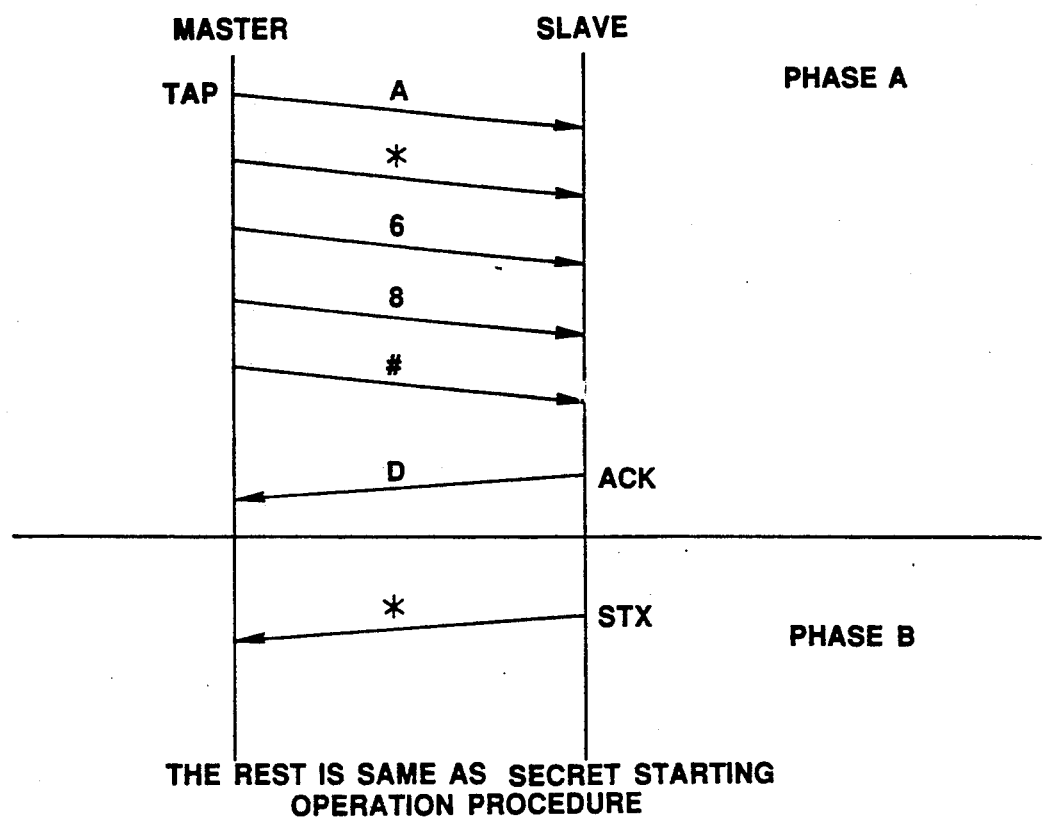
FIG. 6 is a sequence chart for explaining the wiretap detecting operation of the secrecy device.

FIG. 6 shows an exemplary wiretap detecting operation. The wiretap detecting operation is substantially the same as the secrecy starting operation of FIG. 5, except that after the master device starts transmitting the wiretap check request TAP, the master device does not transmit any version number in the phase A.

Figure 7:
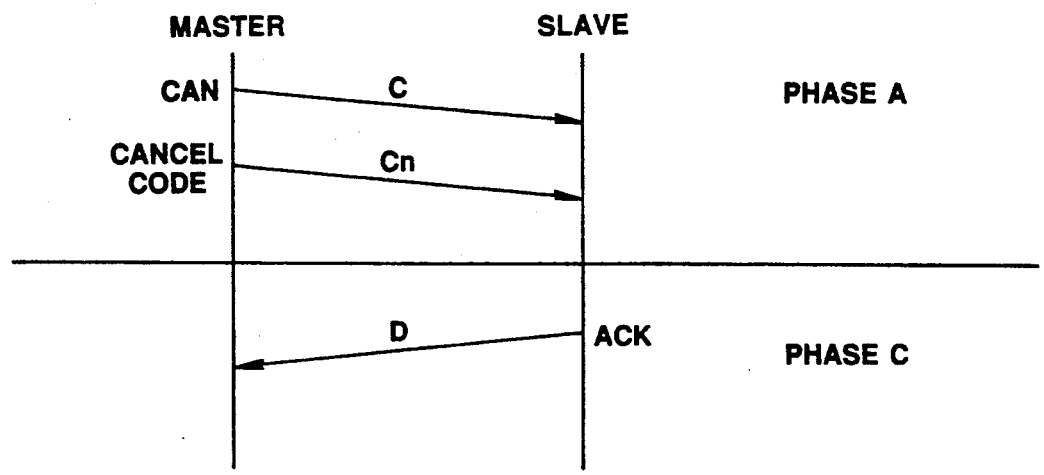
FIG. 7 is a sequence chart for explaining the confidential conversation ending operation of the secret device.

Shown in FIG. 7 is an exemplary secrecy terminating operation which starts with the transmission of a release request CAN from the master device in the phase A. Subsequently, the master device transmits a cancel code Cn indicative of the reason of the cancellation. The subscript of the cancel code Cn has, for example, the following meanings.

1 ... The CAN key was depressed.
2 ... A wiretap was detected.
3 ... The secrecy clock was lost in the demodulation circuit.
0 ... Other abnormal operation was detected.

In the phase B, no data transaction is carried out.

In the phase C, at the moment when the code signal indicative of the reason of the cancellation disappears, the slave device transmits an acknowledge response ACK and turns off the secrecy circuit.

What is claimed is:

1. A secrecy device connected between a telephone handset and a telephone body comprising:
    a secrecy circuit comprising
        modulation means for modulating a voice signal received from said handset on a predetermined modulation system basis and sending a modulated voice signal to said telephone body;
        demodulation means for demodulating a modulated voice signal received from the telephone body on a predetermined demodulation system basis and sending a demodulated voice signal to the handset;
    detection means for detecting the presence of a connection of a wiretapping telephone set to a line connecting two communicating party telephone sets.

2. A secrecy device as set forth in claim 1, wherein said detection means includes:
    means, in response to reception of a request signal generated at the secrecy device of one of said two communicating party telephone sets, for generating pseudorandom data and transmitting said pseudorandom data to the secrecy device of said one of said two communicating party telephone sets which has generated said request signal;
    means, in response to reception of the pseudorandom data, for returning as echo-back data same as the pseudorandom data to the secrecy device of the other one of said two communicating party telephone sets which has transmitted said pseudorandom data; and
    means for comparing the pseudorandom data generated at the secrecy device of its own telephone set with said echo-back data and when both data do not coincide with each other, for generating a detection output.

3. A secrecy device as set forth in claim 1 further comprising information means for informing the communicating parties of the presence of a detection output from said detection means.

4. A secrecy device as set forth in claim 1 further comprising inhibition means for inhibiting said secrecy device from being put in its confidential conversation mode when said detection means generates a detection output.

5. A secrecy device as set forth in claim 1 further comprising display means for displaying data specifying the modulation system of said modulation means and specifying the demodulation system of said demodulation means and means for variably changing display brightness of said display means.

* * * * *